(12) United States Patent
Gao et al.

(10) Patent No.: US 7,949,074 B2
(45) Date of Patent: May 24, 2011

(54) APPARATUS AND METHOD FOR DECODING IN A HIERARCHICAL, MODULATION SYSTEM

(75) Inventors: Wen Gao, Plainsboro, NJ (US); Joshua Lawrence Koslov, Hopewell, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 1601 days.

(21) Appl. No.: 10/555,617

(22) PCT Filed: Apr. 24, 2004

(86) PCT No.: PCT/US2004/013735
§ 371 (c)(1),
(2), (4) Date: Nov. 4, 2005

(87) PCT Pub. No.: WO2004/100478
PCT Pub. Date: Nov. 18, 2004

(65) Prior Publication Data
US 2006/0227901 A1  Oct. 12, 2006

(51) Int. Cl.
*H04L 27/06* (2006.01)
(52) U.S. Cl. .................................. 375/340; 375/346
(58) Field of Classification Search .......... 375/340, 375/316, 346, 308, 261, 279, 329, 298; 455/296, 455/63.1
See application file for complete search history.

(56) References Cited

U.S. PATENT DOCUMENTS

| | | | |
|---|---|---|---|
| 5,448,555 A | 9/1995 | Bremer et al. | |
| 5,646,935 A | 7/1997 | Ishikawa et al. | |
| 5,657,354 A | 8/1997 | Thesling et al. | |
| 5,966,412 A | 10/1999 | Ramaswamy | |
| 5,983,174 A | 11/1999 | Wong et al. | |
| 6,834,088 B2 | 12/2004 | Agami et al. | |
| 2002/0026615 A1* | 2/2002 | Hewitt et al. | 714/752 |
| 2002/0097785 A1* | 7/2002 | Ling et al. | 375/147 |
| 2002/0181604 A1* | 12/2002 | Chen | 375/279 |
| 2005/0068918 A1* | 3/2005 | Mantravadi et al. | 370/328 |
| 2005/0157822 A1* | 7/2005 | Khandekar et al. | 375/340 |
| 2006/0056541 A1* | 3/2006 | Chen et al. | 375/316 |

FOREIGN PATENT DOCUMENTS

JP 2002-330188 11/2002
WO WO 01/39453 A1 5/2001

OTHER PUBLICATIONS

Search Report.
Taricco G. et al. "Some simple coded-modulation schemes for unequal error protectoin in satellite communications" Spread Spectrum Techniques and Applications Proceedings, 1996, IEEE 4TH International Symposium on Mainz, Germany Sep. 22-25, 1996 New York, NY USA IEEE US Sep. 22, 1996 (pp. 1288-1294, XP010208825 ISBN: 0-7803-3567-8 Sections II and III Figure 1.

(Continued)

*Primary Examiner* — Chieh M Fan
*Assistant Examiner* — Aristocratis Fotakis
(74) *Attorney, Agent, or Firm* — Robert D. Shedd; Joseph J. Opalach

(57) ABSTRACT

A satellite receiver receives a hierarchical modulation based received signal, which has at least an upper layer (UL) and a lower layer (LL), and simultaneously recovers therefrom data conveyed in the UL signal and data conveyed in the LL signal.

8 Claims, 16 Drawing Sheets

OTHER PUBLICATIONS

Divsalar D. E T Al.: "Multiple turbo does" Military Communications Conference, 1995, MILCOM '95 Conference Record IEEE San Diego, CA USA Nov. 5-8, 1995 New York, NY USA IEEE US Nov. 5, 1995 pp. 279-285 XP010153973 ISBN: 0-7803-2489-7 p. 283 left-hand column, paragraph 1, section 1X.

Calderbank, A.R. "Multilevel codes and multistage dedcoding" IEEE Transactions on Communications, vol. 37, No. 3, Mar. 1989 pp. 222-229 XP002304039 Section III-A.

Kannan Ramchanddran: "Multiresolution Broadcast for Digital HDTV Using Joint Source/Channel Coding" IEEE Journal on Selected Areas in Communications, IEEE Inc. New York, US vol. 11, No. 1, 1993 pp. 6-222 XP000377993 ISSN: 0733-8176 Figure 6b.

Lim J-H et al: "Labeling and decoding schemes for backward-compatible hierarchical coded modulation" 2000 IEEE Wireless Communications and Networking Conference. Conference Record, vol. 1, Sep. 23, 2000 pp. 123-128, XP010532479 p. 123, right-hand column, paragraph 2 figure 3a.

Schilpp M et al "Multilevel codes for digital HDTV" Coummunication Technology Proceedings, 1996 ICCT '96 International Conference on Beijing, China May 5-7, 1996 New York, NY USA IEEE, US May 5, 1996 pp. 771-776, XP010532925 ISBN: 0-7803-2916-3 figure 1b p. 773, left-hand column, last paragraph sections II-A, II-B.

Schramm P: "Multilevel coding with independent decoding on levels for efficient communication on static and interleaved fading channels" Personal, Indoor and Mobile Radio Communications, 1997, Waves of the Year 2000. PIMRC '97, The 8th IEEE International Symposium on Helsinki, Finland Sep. 1-4, 1997 New York, NY USA, IEEE, US Sep. 1, 1986 oages 1196-1200 XP010247636 ISBN: 0-7803-3871-5 figure 4.

Papke I. et al. "Different iterative decoding algorithms for combined concatenated coding and multiresolution modulation" Communications, 1994, ICC '94 SUPERCOMM/ICC '94 Conference Record, 'Serving Humanity Through Communications.' IEEE International Conference on New Orleans, LA USA May 1-5, 1994, New York, NY USA IEEE May 1, 1994 pp. 1249-1254 XP010126691 ISBN: 0-7803-1825-0 section 3.1.

Huber, Johannes, "Trellis Coding", 1992, Springer Verlag, pp. 236-249, XP007902473§.

Zehava, Ephraim. "8-PSK Trellis Codes for a Rayleigh Channel." IEEE Transactions on Communications, vol. 40, No. 5, May 1992, pp. 873-884. XP000292222.

* cited by examiner

LLR$_{1,J}$ ... LLR$_{L,J}$

LLR$_{1,1}$ ... LLR$_{L,1}$

I

APPARATUS AND METHOD FOR DECODING IN A HIERARCHICAL, MODULATION SYSTEM this application claims the benefit, under 35 U.S.C. §365 of International Application PCT/US04/13735, filed on Apr. 24, 2004, which was published in accordance with PCT Article 21(2) on Nov. 18, 2004 in English and which claims the benefit of United States provisional application No. 60/467,946, filed May 5 2003.

BACKGROUND OF THE INVENTION

The present invention generally relates to communications systems and, more particularly, to satellite-based communications systems.

As described in U.S. Pat. No. 5,966,412 issued Oct. 12, 1999 to Ramaswamy, hierarchical modulation can be used in a satellite system as a way to continue to support existing legacy receivers yet also provide a growth path for offering new services. In other words, a backward-compatible hierarchical modulation based satellite system permits additional features, or services, to be added to the system without requiring existing users to buy new satellite receivers. In a hierarchical modulation based communications system, at least two signals, e.g., an upper layer (UL) signal and a lower layer (LL) signal, are added together to generate a synchronously modulated satellite signal for transmission. In the context of a satellite-based communications system that provides backward compatibility, the LL signal provides additional services, while the UL signal provides the legacy services, i.e., the UL signal is, in effect, the same signal that was transmitted before—thus, the satellite transmission signal can continue to evolve with no impact to users with legacy receivers. As such, a user who already has a legacy receiver can continue to use the legacy receiver until such time that the user decides to upgrade to a receiver, or box, that can recover the LL signal to provide the additional services.

In a hierarchical modulation receiver, the received signal is sequentially decoded, i.e., the received signal is first processed to recover data conveyed in the UL signal, which is then used to recover data conveyed in the LL signal. In particular, the received signal is first demodulated and the upper layer (UL) is decoded therefrom—this provides the data conveyed in the UL. This data, i.e., the decoded UL signal, is then re-encoded to provide a re-encoded UL signal. The re-encoded UL signal is then subtracted from the demodulated received signal to uncover the LL signal, which is then decoded to recover the data conveyed therein. Hence, the demodulation and decoding of the LL signal depends on the UL signal.

SUMMARY OF THE INVENTION

We have observed that sequential decoding in a hierarchical modulation receiver not only adds complexity to the receiver, but also may degrade receiver performance if the recovered upper layer (UL) signal doesn't match the originally transmitted UL signal due to errors in the UL decoding process—thus, introducing errors into the recovered LL signal. Therefore, and in accordance with the principles of the invention, a receiver receives a hierarchical modulation based received signal, which comprises at least a first signal layer and a second signal layer, and simultaneously recovers therefrom data conveyed in the first signal layer and data conveyed in the second signal layer.

In an embodiment of the invention, a satellite communications system comprises a transmitter, a satellite transponder and a receiver. The transmitter transmits an uplink hierarchical modulation based signal to the satellite transponder, which broadcasts the hierarchical modulation based signal downlink to a receiver. The receiver processes the received hierarchical modulation based signal such that data conveyed in the UL and data conveyed in the LL are simultaneously recovered therefrom.

In another embodiment of the invention, a satellite communications system comprises a transmitter, a satellite transponder and a receiver. The transmitter transmits an uplink hierarchical modulation based signal to the satellite transponder, which broadcasts the hierarchical modulation based signal downlink to a receiver. The receiver processes the received hierarchical modulation based signal such that the UL and the LL are processed independently of each other.

In another embodiment of the invention, a receiver for receiving a hierarchical modulation based signal comprising at least a first signal layer and a second signal layer constructs a look-up table of soft metric values. In particular, the receiver receives a training signal from an endpoint and calculates soft metric values as a function of a combined signal space and the received training signal, wherein the combined signal space is a combination of a signal space of the first signal layer and a signal space of the second signal layer. The receiver then stores the calculated soft metric values in the look-up table.

BRIEF DESCRIPTION OF THE DRAWINGS

FIG. 11 shows an illustrative log-likelihood look-up table in accordance with the principles of the invention;

DETAILED DESCRIPTION

Other than the inventive concept, the elements shown in the figures are well known and will not be described in detail. Also, familiarity with satellite-based systems is assumed and is not described in detail herein. For example, other than the inventive concept, satellite transponders, downlink signals, symbol constellations, a radio-frequency (rf) front-end, or receiver section, such as a low noise block downconverter, formatting and source encoding methods (such as Moving Picture Expert Group (MPEG)-2 Systems Standard (ISO/IEC 13818-1)) for generating transport bit streams and decoding methods such as log-likelihood ratios, soft-input-soft-output (SISO) decoders, Viterbi decoders are well-known and not described herein. In addition, the inventive concept may be implemented using conventional programming techniques, which, as such, will not be described herein. Finally, like-numbers on the figures represent similar elements.

Figure 1:
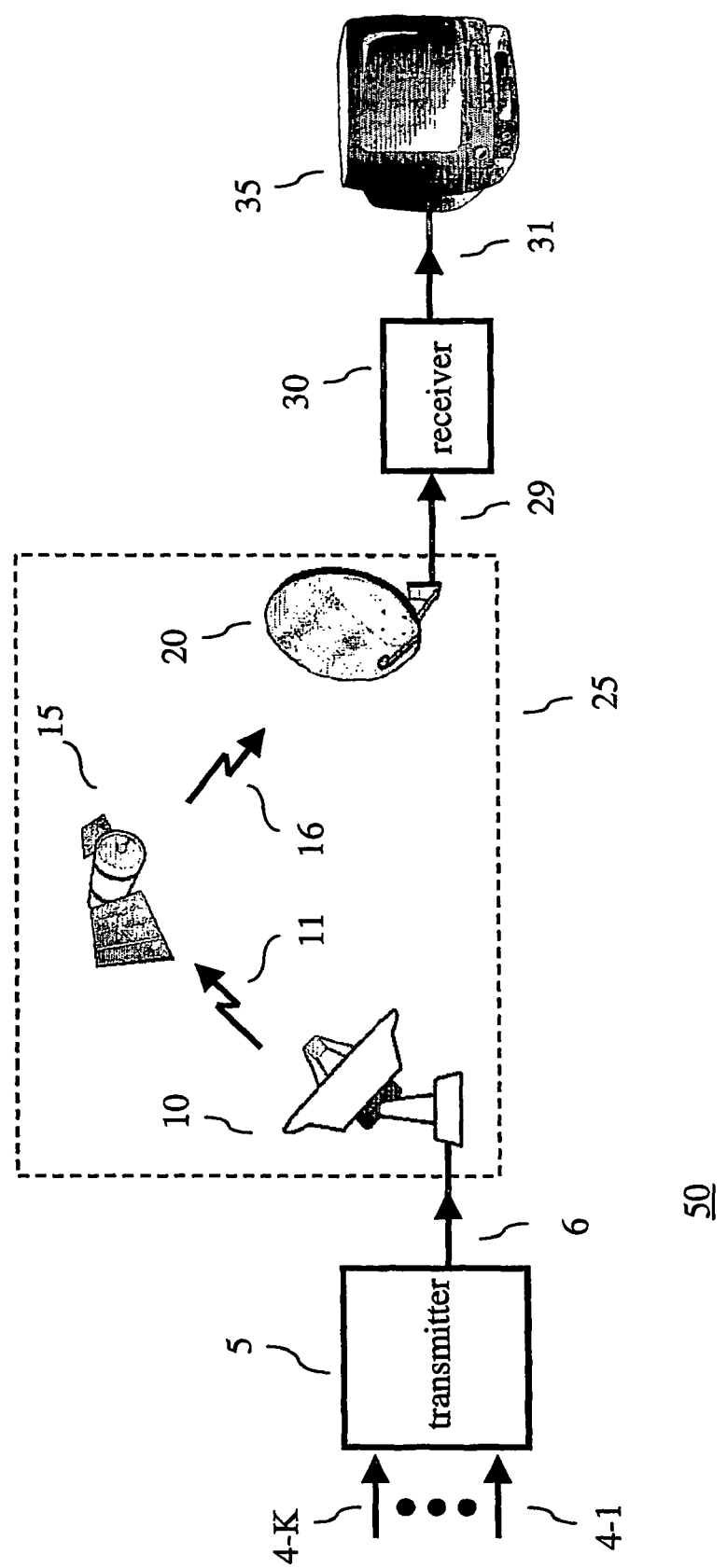
FIG. 1 shows an illustrative satellite communications system embodying the principles of the invention.
Figure 2:
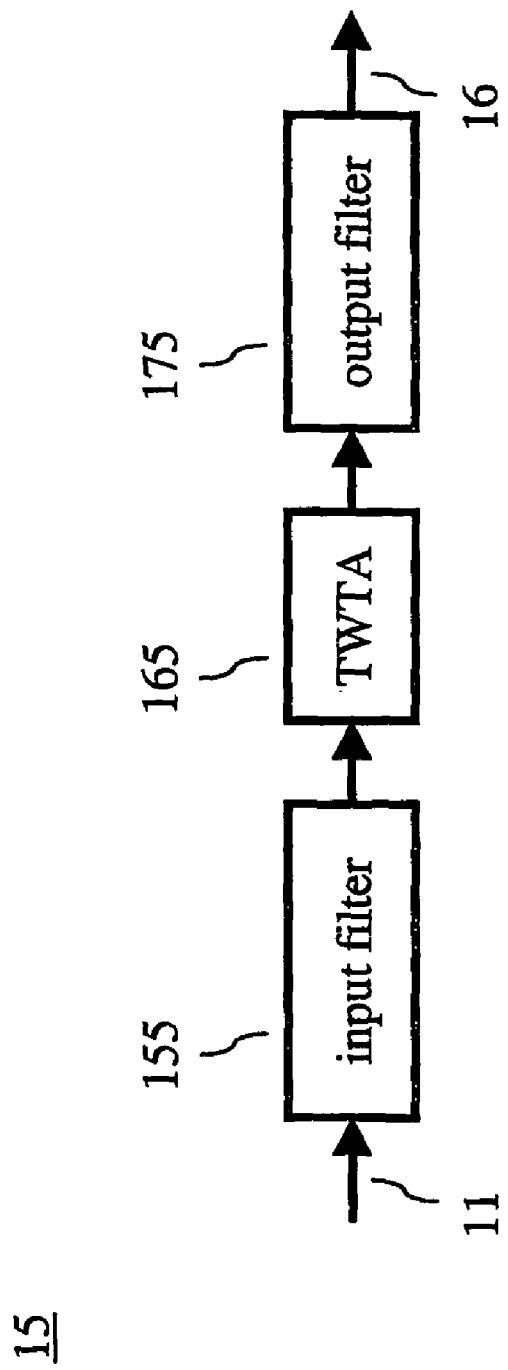
FIG. 2 shows an illustrative block diagram of a transmission path through satellite 15 of FIG. 1.

An illustrative communications system 50 in accordance with the principles of the invention is shown in FIG. 1. Communications system 50 includes transmitter 5, satellite channel 25, receiver 30 and television (TV) 35. Although described in more detail below, the following is a brief overview of communications system 50. Transmitter 5 receives a number of data streams as represented by signals 4-1 through 4-K and provides a hierarchical modulation based signal 6 to satellite transmission channel 25. Illustratively, these data streams represent control signaling, content (e.g., video), etc., of a satellite TV system and may be independent of each other or related to each other, or a combination thereof. The hierarchical modulation based signal 6 has K layers, where K≧2. It should be noted that the words "layer" and "level" are used interchangeably herein. Satellite channel 25 includes a transmitting antenna 10, a satellite 15 and a receiving antenna 20. Transmitting antenna 10 (representative of a ground transmitting station) provides hierarchical modulation based signal 6 as uplink signal 11 to satellite 15. Referring briefly to FIG. 2, an illustrative block diagram of the transmission path through satellite 15 for a'signal is shown. Satellite 15 includes an input filter 155, a traveling wave tube amplifier (TWTA) 165 and an output filter 175. The uplink signal 11 is first filtered by input filter 155, then amplified for retransmission by TWTA 165. The output signal from TWTA 165 is then filtered by output filter 175 to provide downlink signal 16 (which is typically at a different frequency than the uplink signal). As such, satellite 15 provides for retransmission of the received uplink signal via downlink signal 16 to a broadcast area. This broadcast area typically covers a predefined geographical region, e.g., a portion of the continental United States. Turning back to FIG. 1, downlink signal 16 is received by receiving antenna 20, which provides a received signal 29 to receiver 30, which, in accordance with the principles of the invention, demodulates and simultaneously decodes received signal 29 to provide, e.g., content to TV 35 for viewing thereon. It should be noted that although not described herein, transmitter 5 may further predistort the signal before transmission to compensate for non-linearities in the channel.

Figure 3:
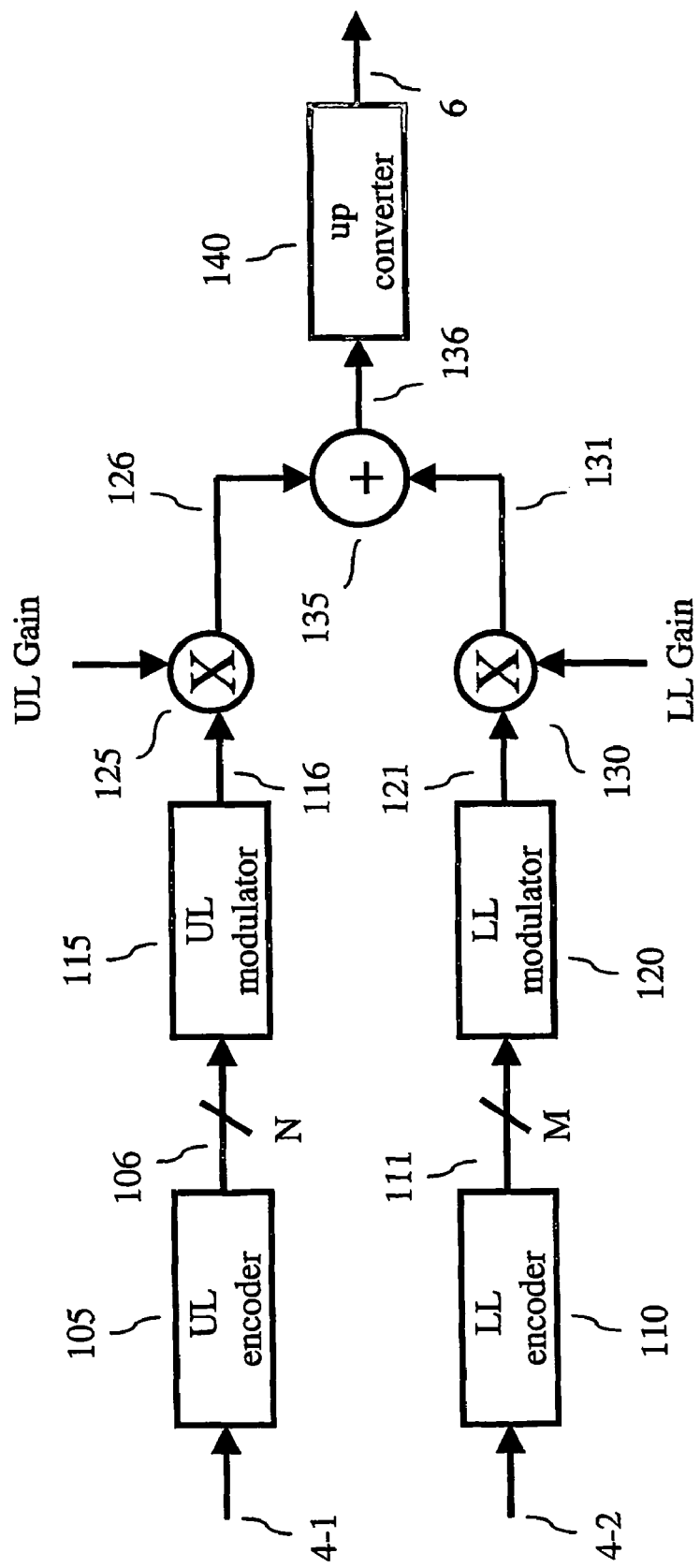
FIG. 3 shows an illustrative embodiment for implementing hierarchical modulation in transmitter 5 of FIG. 1.

An illustrative block diagram of a hierarchical modulator for use in transmitter 5 is shown in FIG. 3. Hierarchical modulation is simply described as a synchronous modulation system where a lower layer signal is synchronously embedded into an upper layer signal so as to create a higher order modulation alphabet. In the remainder of this description it is illustratively assumed that there are two data streams, i.e., K=2. It should be noted that the invention is not limited to K=2 and, in fact, a particular data stream such as signal 4-1 may already represent an aggregation of other data streams (not shown).

In FIG. 3, the hierarchical modulation transmitter comprises UL encoder 105, UL modulator 115, LL encoder 110, LL modulator 120, multipliers (or amplifiers) 125 and 130, combiner (or adder) 135 and up converter 140. The upper layer (UL) path is represented by UL encoder 105, UL modulator 115 and amplifier 125; while the lower layer (LL) path is represented by LL encoder 110, LL modulator 120 and amplifier 130. As used herein, the term "UL signal" refers to any signal in the UL path and will be apparent from the context. For example, in the context of FIG. 3, this is one or more of the signals 4-1, 106 and 116. Similarly, the term "LL signal" refers to any signal in the LL path. Again, in the context of FIG. 3, this is one of more of the signals 4-2, 111 and 121. Further, each of the encoders implement known error detection/correction codes (e.g., convolutional or trellis codes; concatenated forward error correction (FEC) scheme, where a rate ½, ⅔, ⅘ or ⁶⁄₇ convolutional code is used as an inner code, and a Reed Solomon code is used as an outer code; LDPC codes (low density parity check codes); etc.). For example, typically UL encoder 105 uses a convolutional code or a short block code; while LL encoder 110 uses a turbo code or LDPC code. For the purposes of this description it is assumed that LL encoder 110 uses an LDPC code. In addition, a convolutional interleaver (not shown) may also be used.

Figure 4:
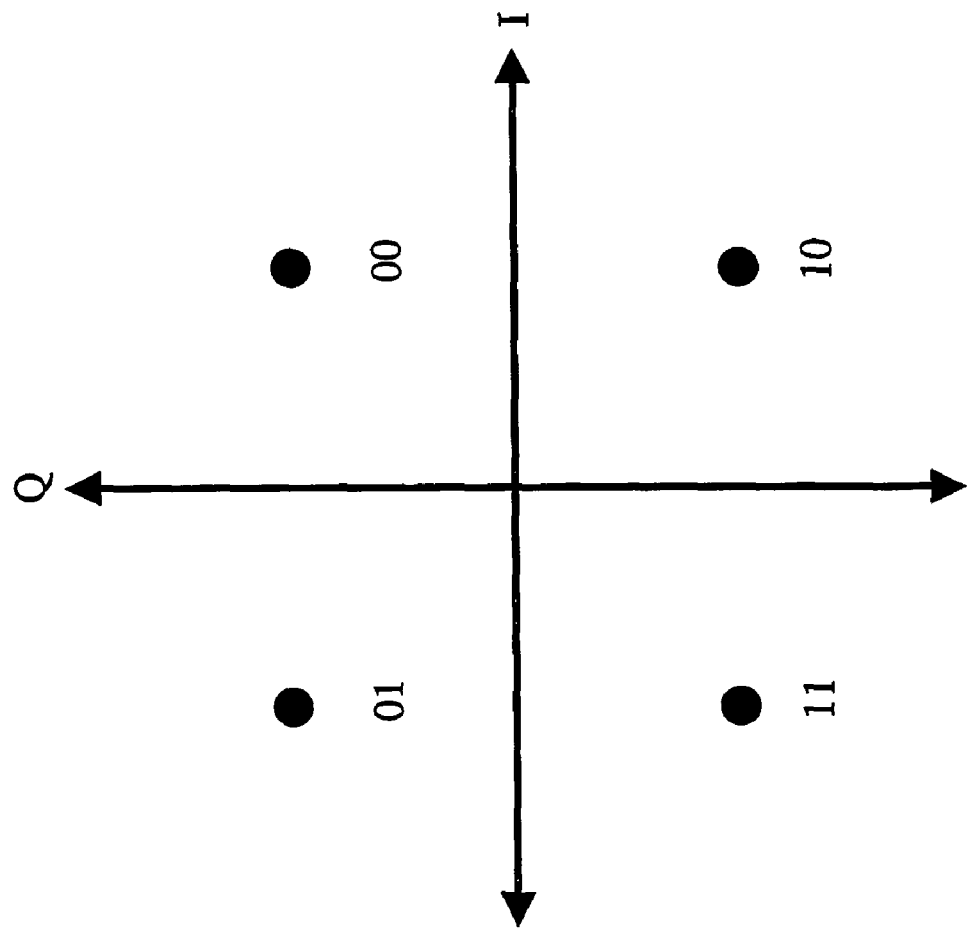
FIG. 4 show an illustrative symbol constellation for use in the upper layer and the lower layer.

As can be observed from FIG. 3, signal 4-2 is applied to LL encoder 110, which provides an encoded signal 111 to LL modulator 120. Likewise, signal 4-1 is applied to UL encoder 105, which provides an encoded signal 106 to UL modulator 115. Encoded signal 106 represents N bits per symbol interval T; while encoded signal 111 represents M bits per symbol interval T, where N may, or may not, equal M. Modulators 115 and 120 modulate their respective encoded signals to provide modulated signals 116 and 121, respectively. It should be noted that since there are two modulators, 115 and 120, the modulation can be different in the UL path and the LL path. Again, for the purposes of this description it is assumed that the number of UL encoded data bits is two, i.e., N=2, and that UL modulator 115 generates a modulated signal 116 that lies in one of four quadrants of a signal space. That is, UL modulator 115 maps two encoded data bits to one of four symbols. Similarly, the number of LL encoded data bits is also assumed to be two, i.e., M=2, and LL modulator 120 also generates a modulated signal 121 that lies in one of four quadrants of the signal space. An illustrative symbol constellation 89 for use in both the UL and the LL is shown in FIG. 4. It should be noted that signal space 89 is merely illustrative and that symbol constellations of other sizes and shapes can be used.

Figure 5:
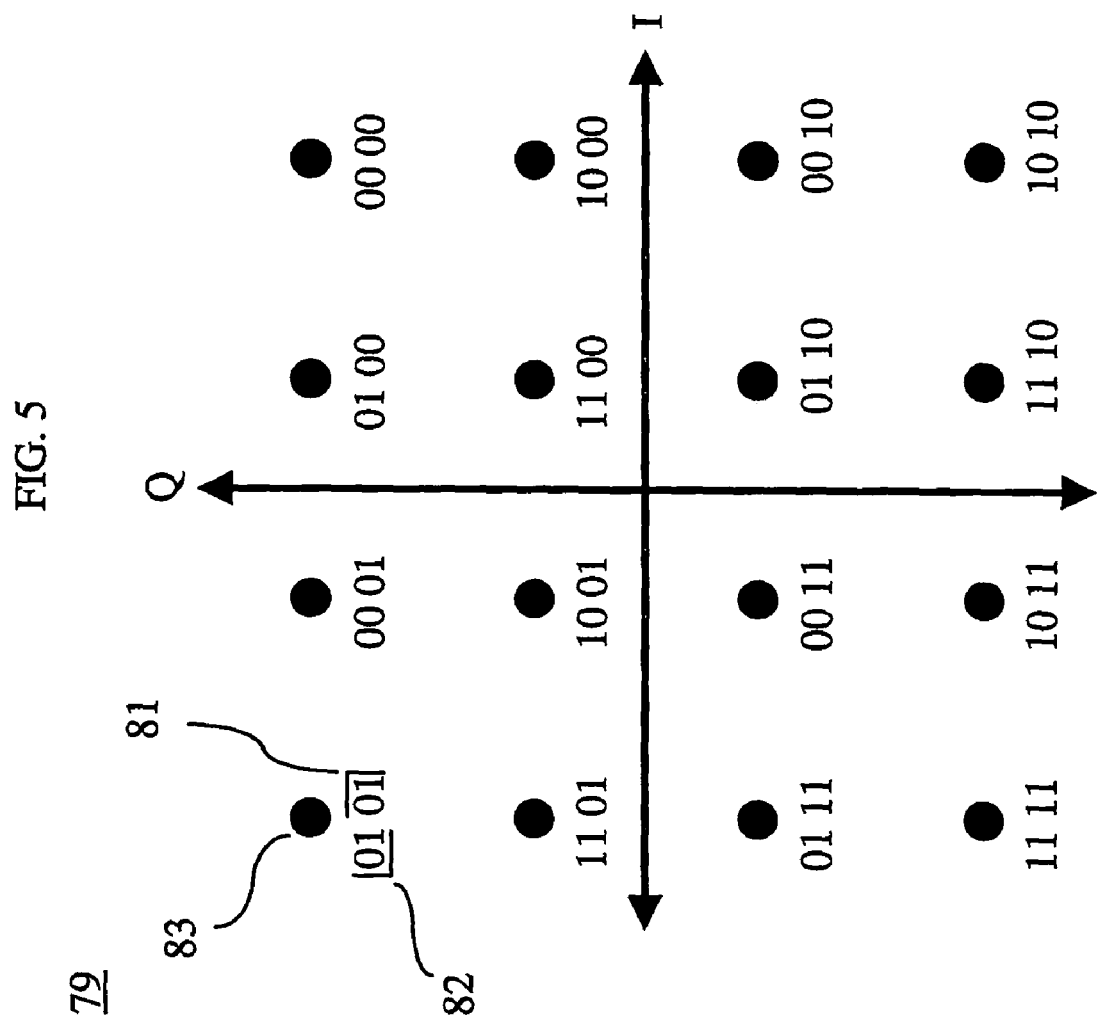
FIG. 5 shows an illustrative symbol constellation for a hierarchical modulation based signal.

However, the output signals from UL modulator 115 and LL modulator 120 are further adjusted in amplitude by a predefined UL gain and a predefined LL gain via amplifiers 125 and 130, respectively. It should be noted that the gains of the lower and upper layer signals determine the ultimate placement of the points in the signal space. For example, the UL gain may be set to unity, i.e., 1, while the LL gain may be set to 0.5. The UL signal and the LL signal are then combined via combiner, or adder, 135, which provides combined signal 136. Thus, the modulator of FIG. 3, e.g., the amplifiers 125 and 130, along with combiner 135, effectively further rearranges and partitions the signal space such that the UL signal specifies one of the four quadrants of the signal space; while the LL signal specifies one of a number of subquadrants of a particular quadrant of the signal space as illustrated in FIG. 5 by signal space 79.

Figure 6:
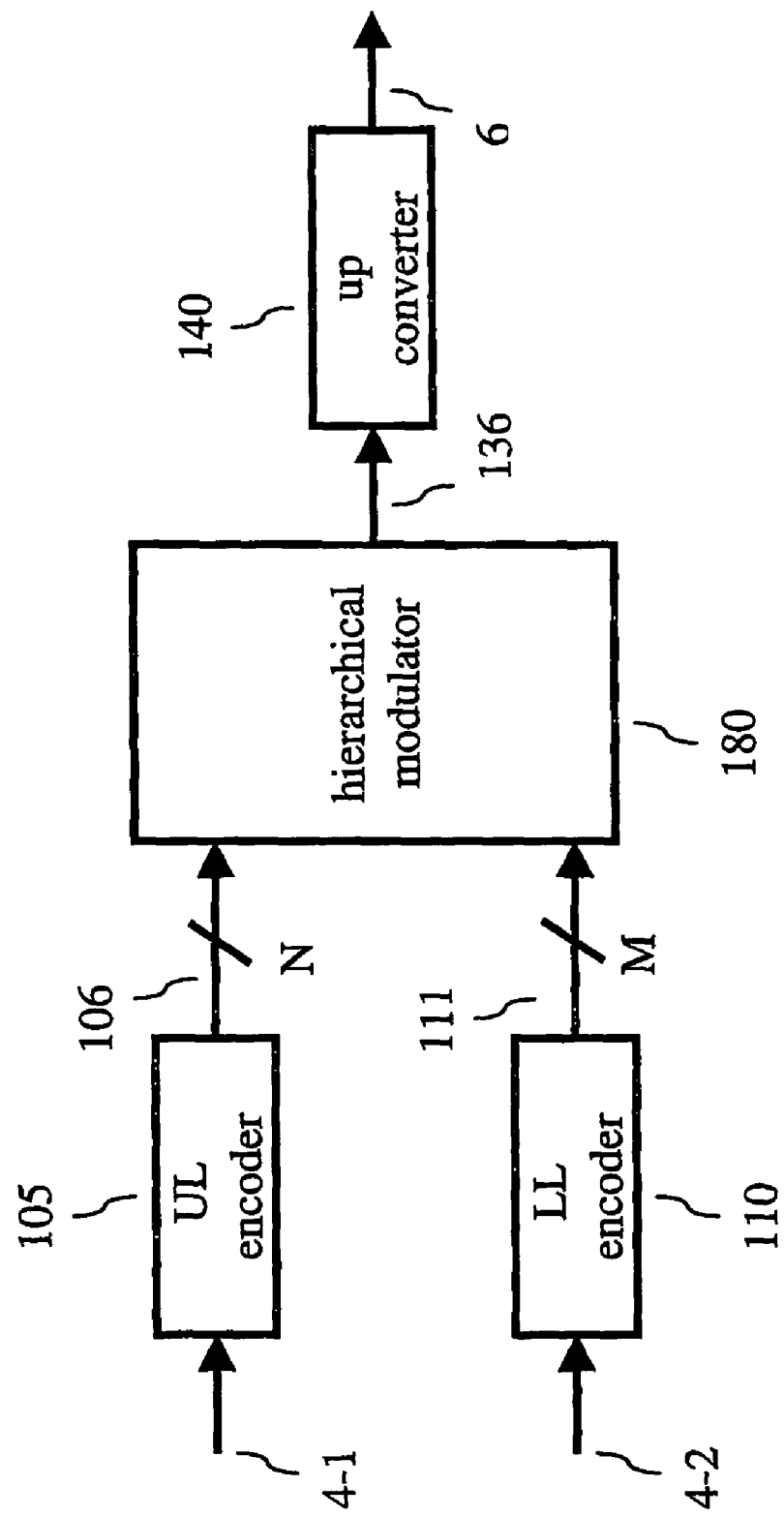
FIG. 6 shows another illustrative embodiment for implementing hierarchical modulation in transmitter 5 of FIG. 1.

In effect, the resulting signal space 79, also referred to herein as the combined signal space 79, comprises 16 symbols, each symbol located at a particular signal point in the signal space and associated with a particular four bits. For example, symbol 83 is associated with the four bit sequence "01 01". The lower two bit portion 81 is associated with the UL and specifies a quadrant of signal space 79; while the upper two bit portion 82 is associated with the LL and specifies a subquadrant of the quadrant specified by two bit portion 81. It should be noted that since the UL signal identifies the quadrant, the LL signal effectively looks like noise on the UL signal. In this regard, combined signal space 79 is representative of the concept and the distances between symbols therein is not to scale. Returning to FIG. 3, the combined signal 136 is applied to up converter 140, which provides multi-level modulated signal 6 at the appropriate-transmission frequency. Turning briefly to FIG. 6, another illustrative embodiment for implementing hierarchical modulation in transmitter 5 is shown. FIG. 6 is similar to FIG. 3 except that hierarchical modulator 180 performs the mapping of the lower layer and upper layer bits into the combined signal space. For example, the upper layer may be a QPSK (quadrature phase-shift keying) signal space, while the lower layer is a BPSK (binary phase-shift keying) signal space.

Figure 7:
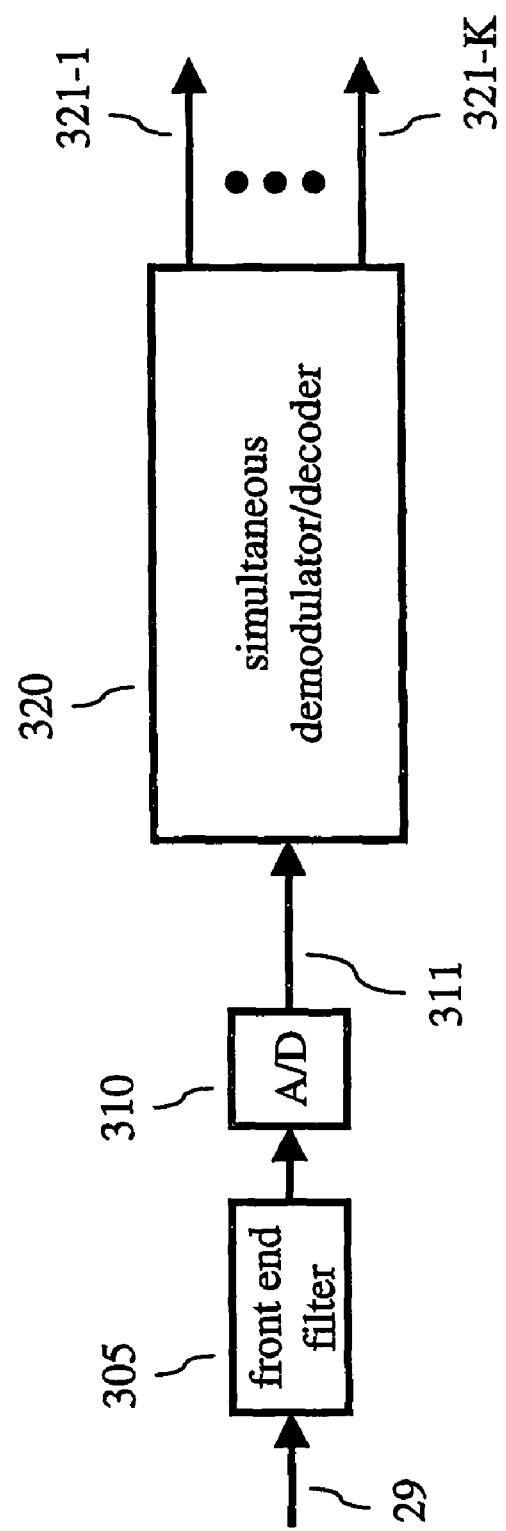
FIG. 7 shows an illustrative block diagram of a receiver in accordance with the principles of the invention.

As noted above, after reception of the downlink signal 16 by receiving antenna 20, receiver 30 demodulates and decodes received signal 29 to provide, e.g., content to TV 35 for viewing thereon. An illustrative portion of receiver 30 in accordance with the principles of the invention is shown in FIG. 7. Receiver 30 includes front end filter 305, analog-to-digital converter 310 and simultaneous demodulator/decoder 320. Front end filter 305 down-converts and filters received signal 29 to provide a near base-band signal to A/D 310, which samples the down converted signal to convert the signal to the digital domain and provide a sequence of samples 311 (also referred to as hierarchical signal 311) to simultaneous demodulator/decoder 320. The latter performs demodulation of hierarchical signal 311 and, in accordance with the principles of the invention, simultaneous, or independent, decoding of the resulting demodulated signal to provide a number of output signals, 321-1 to 321-K, representative of data conveyed by hierarchical signal 311 on the K layers. Data from one or more of these output signals are provided to TV set 35 via signal 31. (In this regard, receiver 30 may additionally process the data before application to TV set 35 and/or directly provide the data to TV set 35.) In the following example the number of levels is two, i.e., K=2, but the inventive concept is not so limited. For example, simultaneous demodulator/decoder 320 provides UL signal 321-1 and LL signal 321-2. The former ideally represents what was transmitted on the upper layer, i.e., signal 4-1 of FIG. 3; while the latter ideally represents what was transmitted on the lower layer, i.e., signal 4-2 of FIG. 3.

Figure 8:
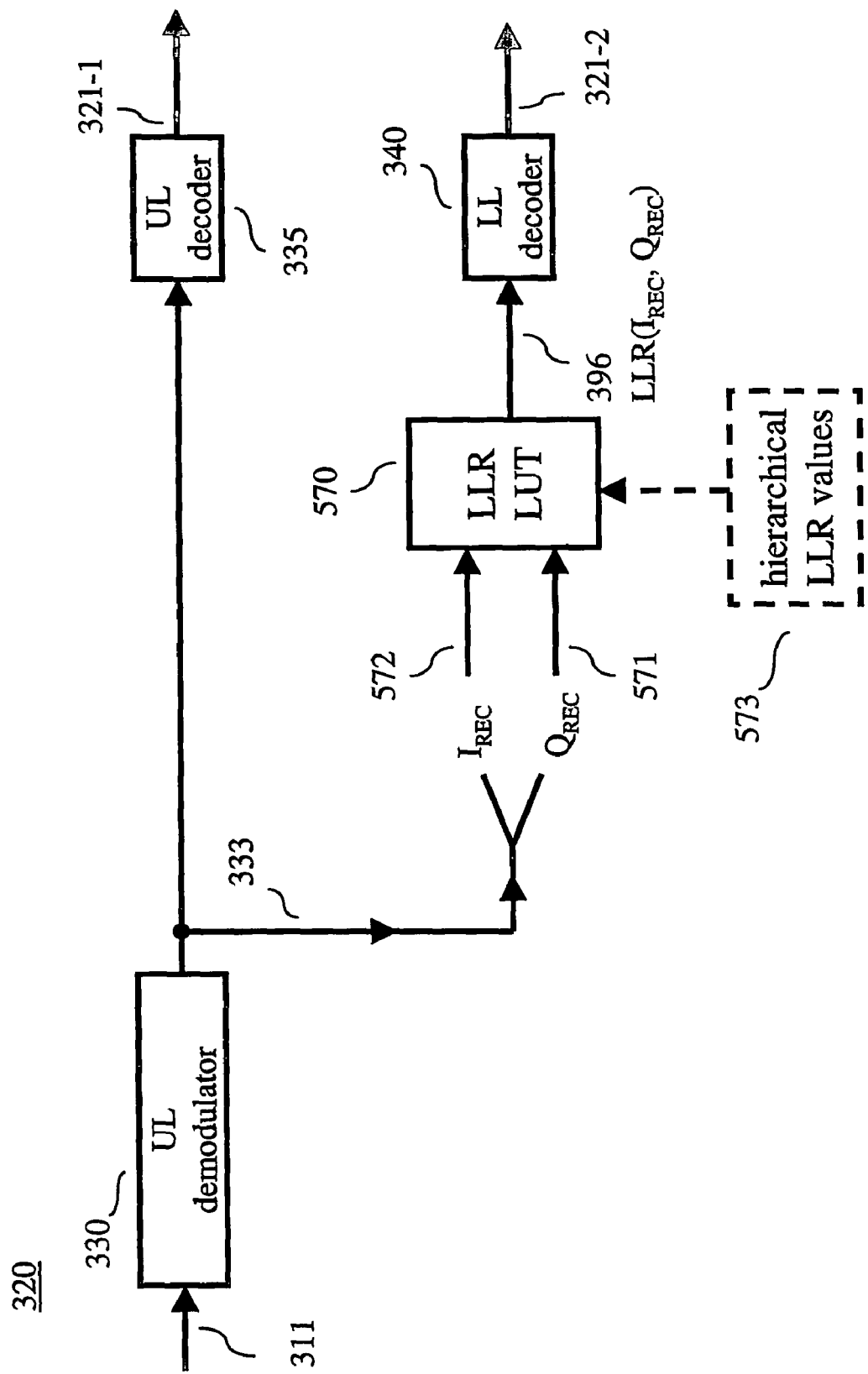
FIG. 8 shows an illustrative block diagram of simultaneous demodulator/decoder 320 of FIG. 7 in accordance with the principles of the invention.
Figure 9:
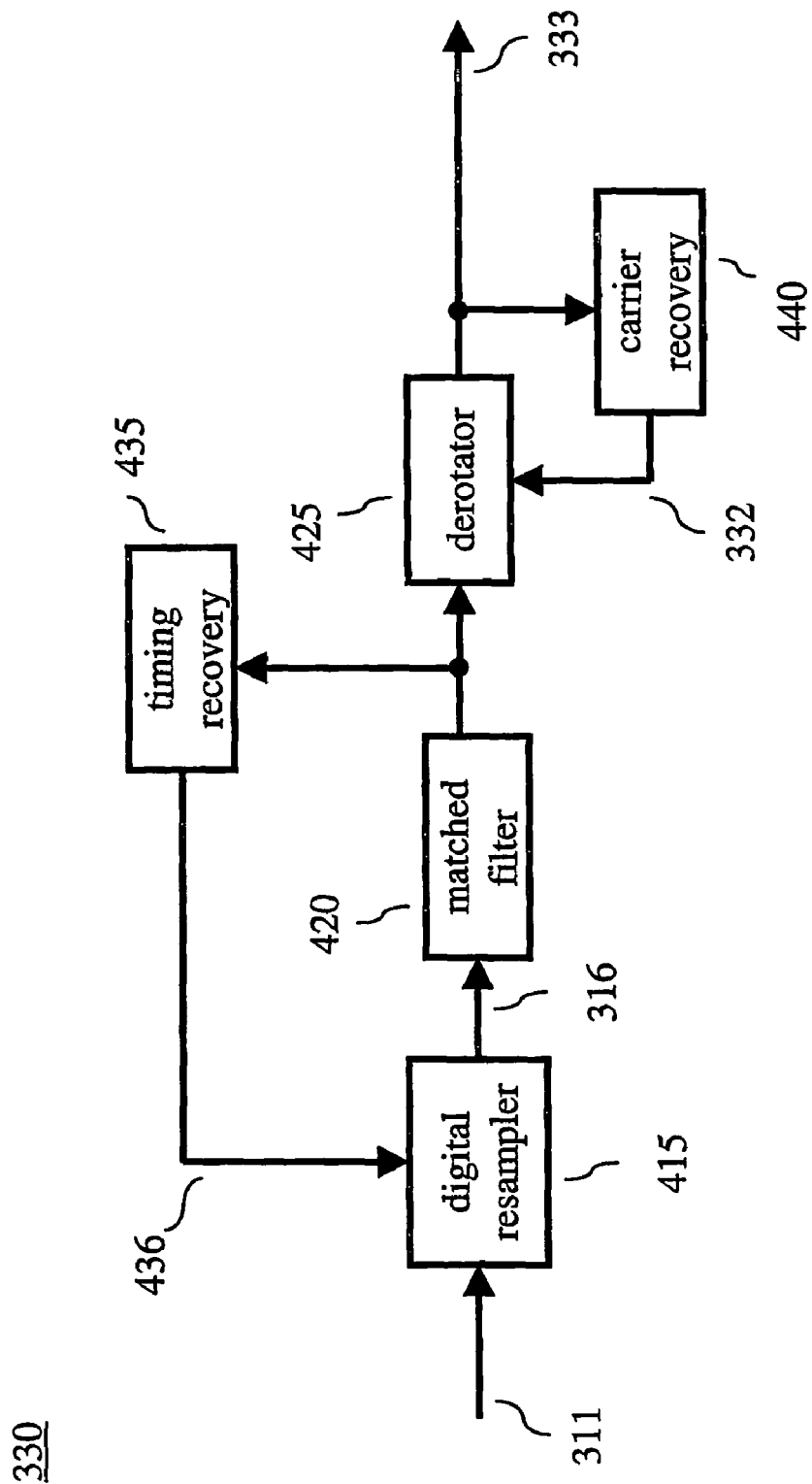
FIG. 9 shows an illustrative block diagram of demodulator 330 of FIG. 8.

Turning now to FIG. 8, an illustrative block diagram of simultaneous demodulator/decoder 320 is shown. Unified demodulator/decoder 320 comprises UL demodulator 330, UL decoder 335, log likelihood ratio (LLR) look-up table (LUT) 570 and LL decoder 340. Hierarchical signal 311 is applied to UL demodulator 330, which demodulates this signal and provides therefrom a demodulated UL signal as represented by demodulated UL signal point stream 333. Referring now to FIG. 9, an illustrative block diagram of UL demodulator 330 is shown. UL demodulator 330 includes digital resampler 415, matched filter 420, derotator 425, timing recovery element 435 and carrier recovery element 440. Hierarchical signal 311 is applied to digital resampler 415, which resamples hierarchical signal 311 using UL timing signal 436, which is provided by timing recovery element 435, to provide resampled hierarchical signal 316. Resampled hierarchical signal 316 is applied to matched filter 420. The latter is a band-pass filter for filtering resampled hierarchical signal 316 about the UL carrier frequency to provide a filtered signal to both derotator 425 and the above-mentioned timing recovery element 435, which generates therefrom UL timing signal 436. Derotator 425 derotates, i.e., removes the carrier from the filtered signal to provide a demodulated UL signal point stream 333. Carrier recover element 440 uses the demodulated UL signal point stream 333 to recover therefrom UL carrier signal 332, which is applied to derotator 425.

Referring back to FIG. 8, UL decoder 335 acts in a complementary fashion to corresponding UL encoder 105 of transmitter 5 and decodes the demodulated UL signal point stream 333 to provide UL signal 321-1. As noted above, UL signal 321-1 represents the data conveyed on the upper layer, e.g., as represented by signal 4-1 of FIG. 3. It should be observed that UL decoder 321-1 recovers the data conveyed in the UL by, in effect, treating the LL signal as noise on the UL signal. In other words, EL decoder 321-1 operates as if UL signal 321-1 represents symbols selected from signal space 89 of FIG. 4.

Figure 10:
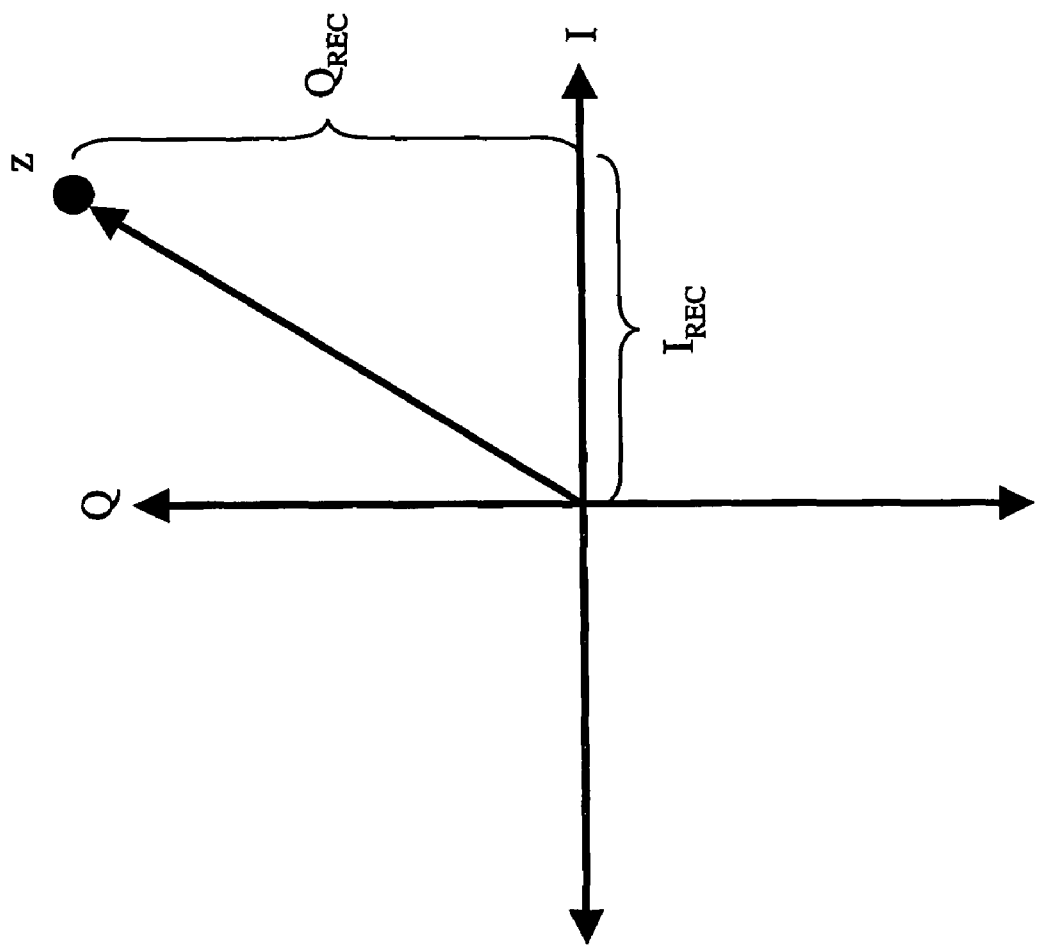
FIG. 10 shows an illustrative signal space.

Turning now to the LL signal, and in accordance with the principles of the invention, UL signal point stream 333 is also provided to LLR LUT 570. UL signal point stream 333 is a stream of received signal points, each received signal point having an in-phase ($I_{REC}$) component (572) and a quadrature ($Q_{REC}$) component (571) in a signal space. This is further illustrated in FIG. 10 for a received signal point z, where;

$$z = I_{rec} + jQ_{rec}. \qquad (1)$$

Figure 11:
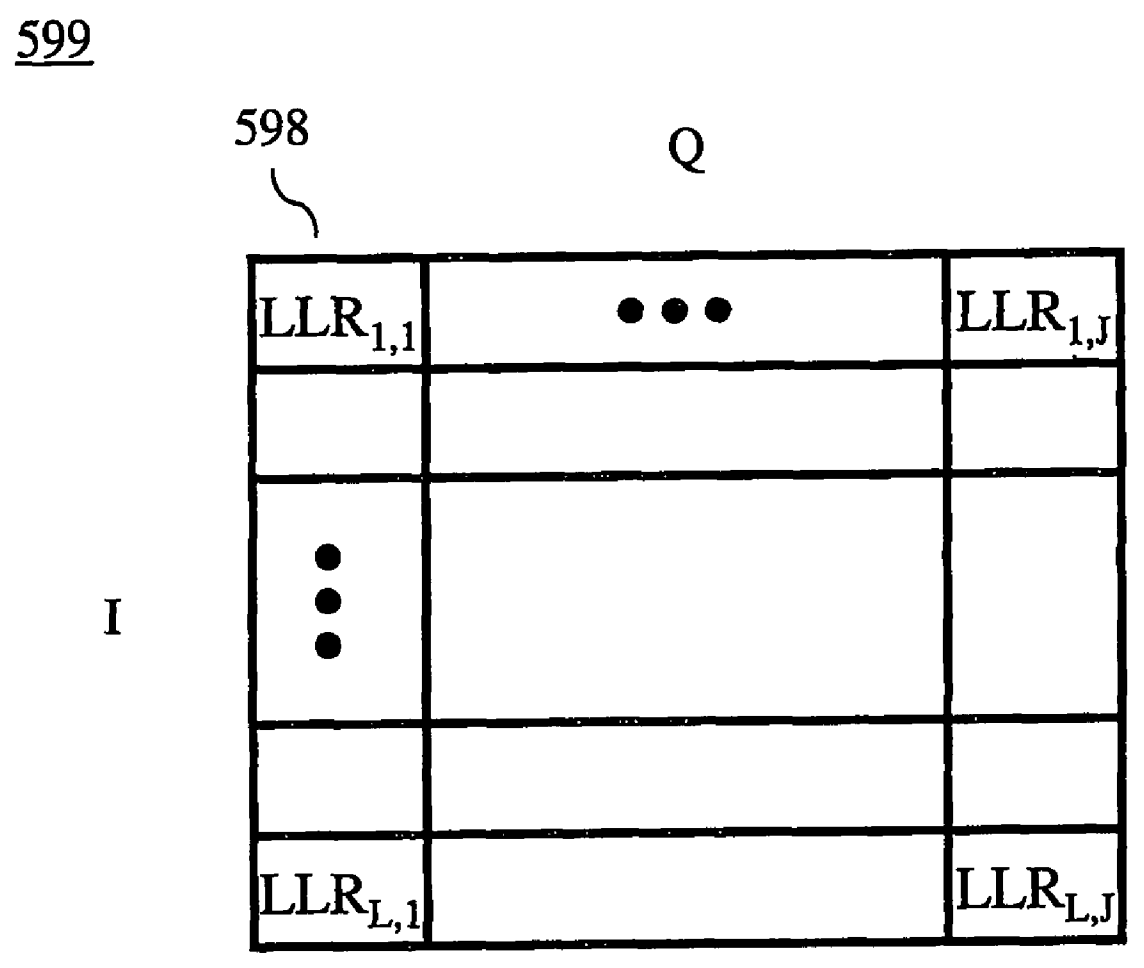

The $I_{REC}$ and $Q_{REC}$ components of each received signal point are applied to LLR LUT 570. The latter stores a LUT 599 of precomputed LLR values as illustrated in FIG. 11. In particular, each row of LUT 599 is associated with a particular I component value (an I row value), while each column of LUT 599 is associated with a particular Q component value (a Q column value). LUT 599 has L rows and J columns. LLR LUT 570 quantizes the $I_{REC}$ and $Q_{REC}$ component values of a received signal point to form an input address, which is used as an index into LUT 599 for selecting therefrom a respective precomputed LLR. Each symbol interval, T, the selected LLR is provided via signal 396 to LL decoder 340. For example, if the $I_{REC}$ component value is quantized to the first row and the $Q_{REC}$ component value is quantized to the first column, then LLR 598 would be selected and provided via signal 396 to LL decoder 340 of FIG. 8.

Other than the inventive concept, and as known in the art, for a given bit-to-symbol mapping $M(b_i)$, where M are the target symbols and $bi = 0, 1, \ldots B-1$, are the bits to be mapped where B is the number of bits in each symbol (e.g., B may be two bits for QPSK, three bits for 8-PSK, etc.), the log-likelihood ratio function for the ith bit of a B bit value is:

$$LLR(i, z) = \log[(\text{prob}(b_i = 1 | z))/(\text{prob}(b_i = 0 | z))]; \qquad (2)$$

where $b_i$ is the ith bit and z is the received signal point in the signal space. The notation "prob ($b_i = 1 | z$)" represents the probability that the ith bit is a "1" given that the signal point z was received. Similarly, the notation "prob ($b_i = 0 | z$)" represents the probability that the ith bit is a "0" given that the signal point z was received.

For a two-dimensional signal space, the probabilities within equation (2) are assumed to be based upon additive Gaussian white noise (AWGN) having a probability density function (PDF) of:

$$\text{prob}(n) = \frac{\exp\left(\frac{-|n|^2}{2\sigma^2}\right)}{2\pi\sigma^2}. \qquad (3)$$

Therefore, the LLR for a given bit and received signal point are defined as:

$$LLR(i, z) = \log \left[ \frac{\sum_{M_{bit\,i}=1} \exp\left(\frac{-|z-M|^2}{2\sigma^2}\right)}{\sum_{M_{bit\,i}=0} \exp\left(\frac{-|z-M|^2}{2\sigma^2}\right)} \right]. \quad (4)$$

It can be observed from equation (4) that the LLR for a given received signal point z is a function of z, the target symbols M, and the rms noise level σ. An LLR is also one example of a "soft metric."

Figure 12:
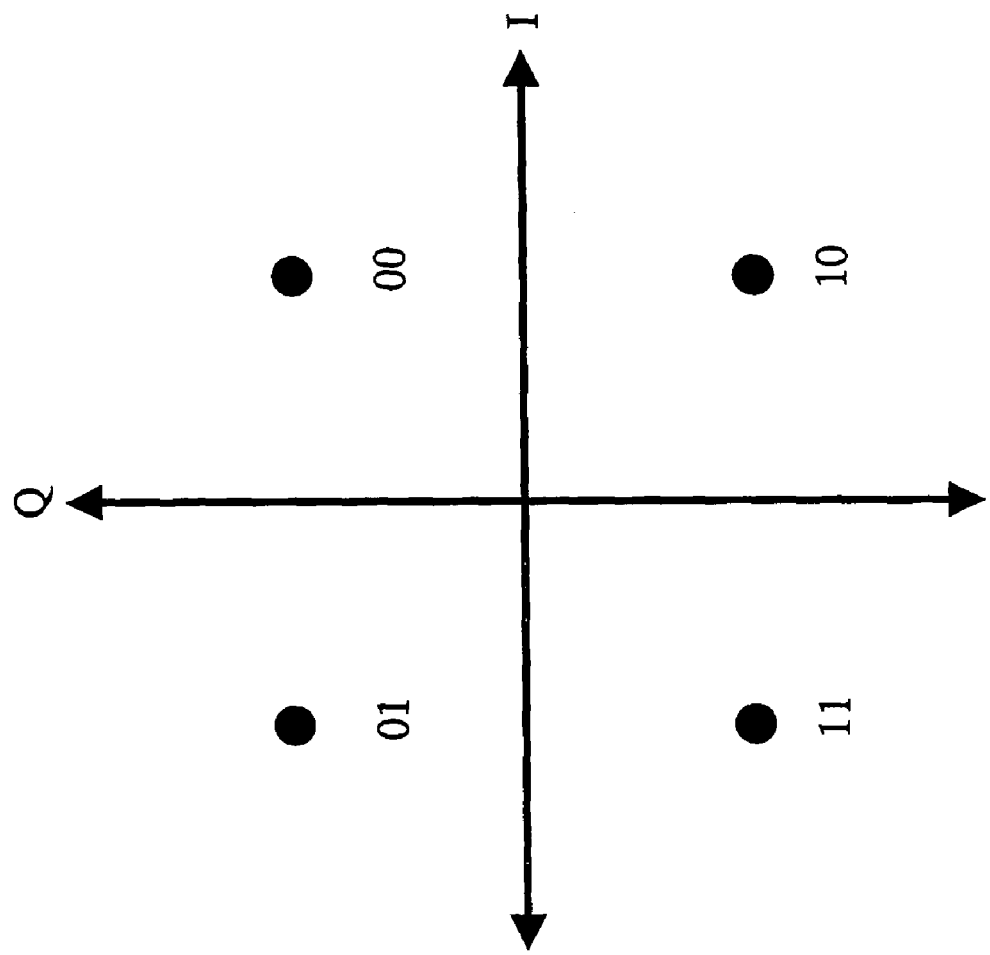
FIG. 12 shows an illustrative symbol constellation.
Figure 13:
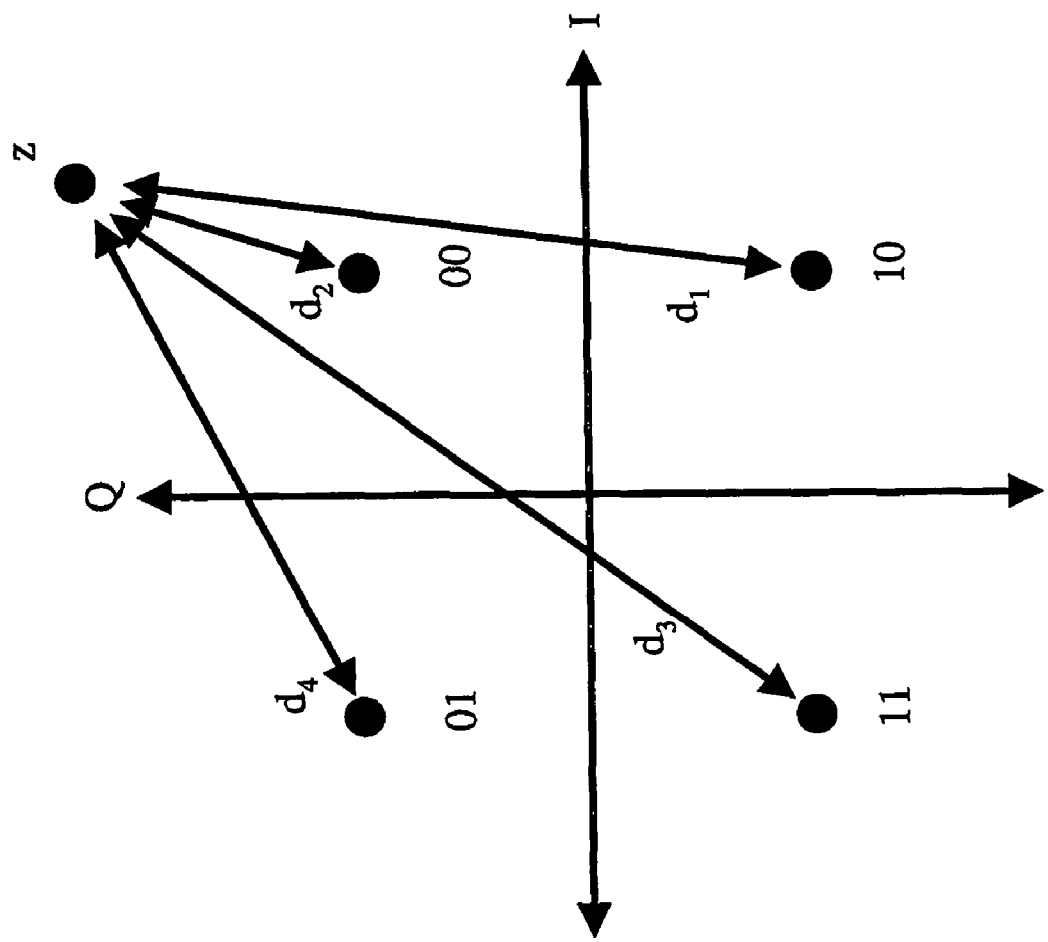
FIGS. 13 and 14 illustrate log-likelihood calculations.

A pictorial illustration of the calculation of an LLR ratio is shown in FIGS. 12 and 13. FIG. 12 shows an illustrative symbol constellation. For simplicity a 4 symbol QPSK (quadrature phase shift keyed) constellation is shown, however, it should be noted that other sizes and shapes of symbol constellations could also have been used, e.g., 3 bits for 8-PSK, 4 bits for 16-QAM, a hierarchical 16-QAM, etc. As can be observed from FIG. 12, there are four symbols in the signal space 89, each symbol associated with a particular two bit mapping [b1, b0]. Turning now to FIG. 13, a received signal point z is shown in relation to the symbols of signal space 89. It can be observed from FIG. 13 that the received signal point z is located at different distances $d_i$ from each of the symbols of signal space 89. For example, the received signal point z is located a distance $d_4$ from the symbol associated with the two bit mapping "01." As such, the LLR(b0) is:

ln [(probability b0 is one)/(probability b0 is zero)];or    (5A)

ln [(probability (symbol 01 or 11))/(probability (symbol 00 or 10))]; or    (5B)

ln [{exp($-d_4^2/(2\sigma^2)$)+exp($-d_3^2/(2\sigma^2)$)}/{exp($-d_2^2/(2\sigma^2)$)+exp($-d_1^2/(2\sigma^2)$)}].    (5C)

while the LLR(b1) is:

ln [(probability b1 is one)/(probability b1 is zero)]; or    (6A)

ln [(probability (symbol 10 or 11))/(probability (symbol 00 or 01))]; or    (6B)

ln [{exp($-d_1^2/(2\sigma^2)$)+exp($-d_3^2/(2\sigma^2)$)}/{exp($-d_2^2/(2\sigma^2)$)+exp($-d_4^2/(2\sigma^2)$)}].    (6C)

Figure 14:
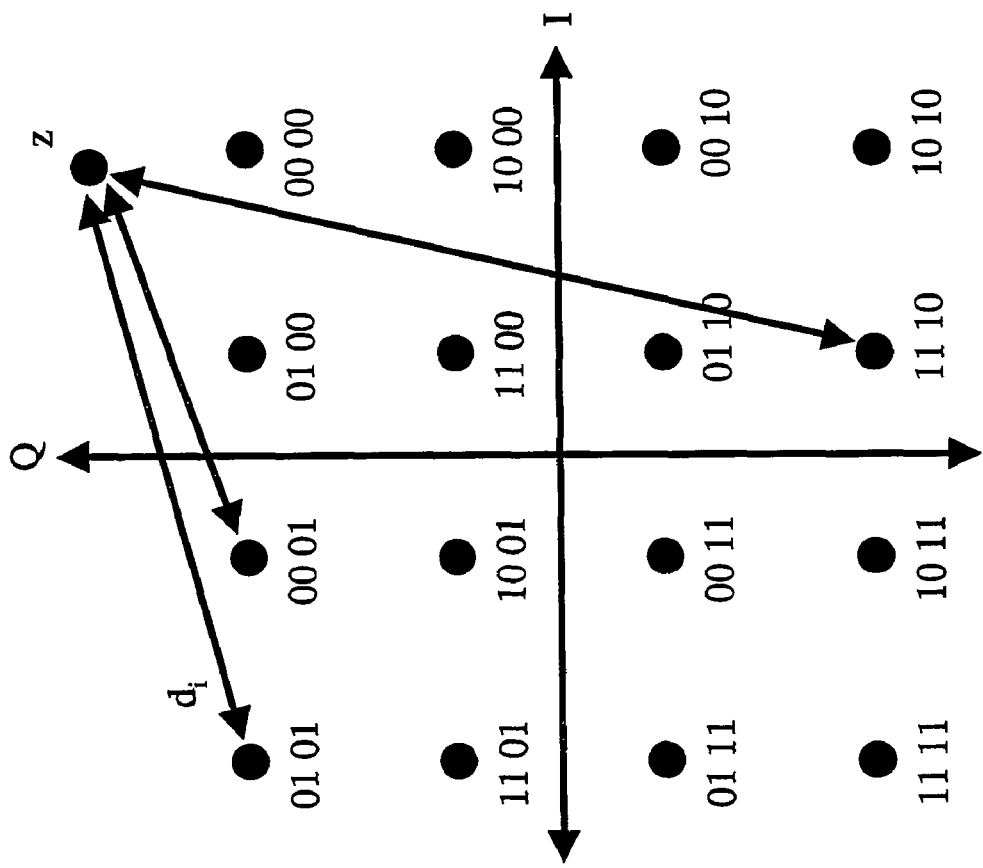

Returning to FIG. 8, it can be observed that LLR LUT 570 (i.e., LUT 599) is initialized to a set of hierarchical LLR values 573. In accordance with the principles of the invention, these are calculated a priori with respect to the combined symbol constellation such as the one illustrated in FIG. 5 and shown again in FIG. 14. In other words, the LLRs for the LL are determined—not with respect to the LL signal space (e.g., signal space 89 of FIG. 4)—but with respect to the combined signal space (e.g., signal space 79 of FIG. 5). For every received signal point z, a distance between each symbol of signal space 79 and the received signal point z is determined and used in calculating an LLR. For simplicity, only some of these distances, $d_i$, are shown in FIG. 14. The hierarchical LLR values 573 can be formed in any number of ways. For example, receiver 30 may perform the calculations by using, e.g., a training signal, provided by transmitter 5 either during start-up, or re-initialization, of communications between the two endpoints (transmitter 5 and receiver 30 ). As known in the art, a training signal is a predefined signal, e.g., a predefined symbol sequence that is known a priori to the receiver. A predefined "handshaking" sequence may further be defined, where the endpoints exchange signaling before communicating data therebetween. Alternatively, the calculations may be performed remotely, e.g., at the location of transmitter 5 and sent to receiver 30 via an in-band or out-of-band signaling channel (this could even be via a dial-up facility (wired and/or wireless) (not shown)).

Referring back to FIG. 8, LL decoder 340 receives the sequence of LLRs (the soft input data), via signal 396, and provides therefrom LL signal 321-2. LL decoder 340 operates in a complementary fashion to that of LL encoder 110. It should also be noted that LL decoder 340 may also be a soft-input-soft-output decoder, and provide soft output values, which are then additionally processed (not shown) to form LL signal 321-2.

Thus, and in accordance with the principles of the invention, receiver 30 directly determines the LL signal from a received hierarchical modulation based signal. This is referred to herein as a simultaneous mode of decoding. In particular, the UL signal point stream 333 is processed to generate soft input data, e.g., LLRs, to recover therefrom the LL data. In other words, receiver 30 processes the received hierarchical modulation based signal such that the UL and the LL are processed independently of each other.

Figure 15:
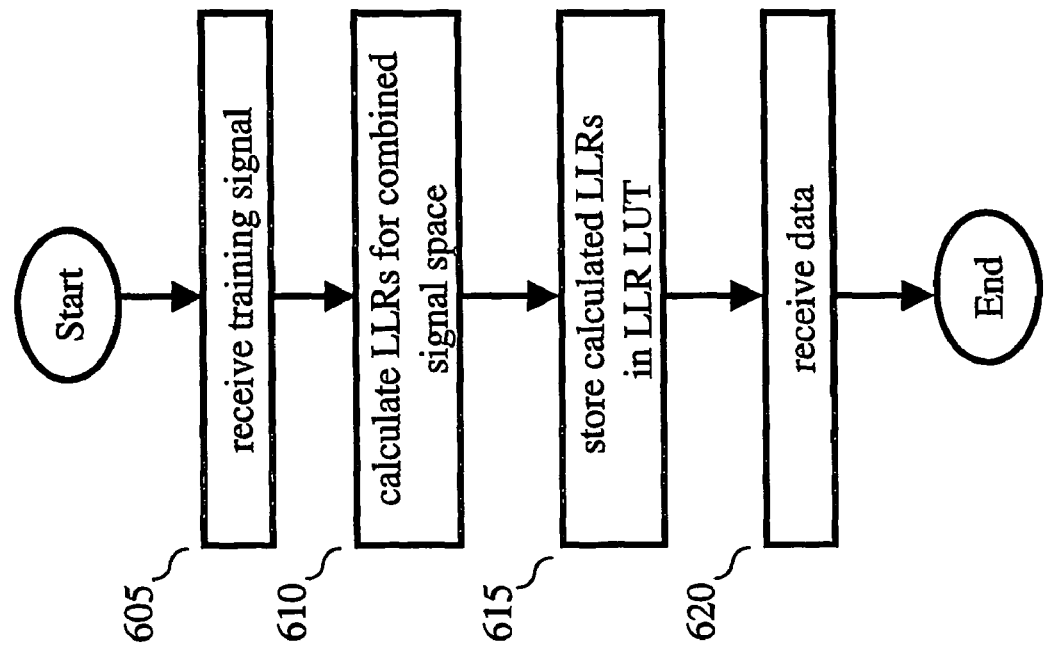
FIG. 15 shows an illustrative flow chart for use in receiver 30 of FIG. 1.

Attention should now be directed to FIG. 15, which shows an illustrative flow chart in accordance with the principles of the invention of a process for use in receiver 30 of FIG. 1. In step 605, receiver 30 begins (or restarts) communications with transmitter 5 and receives a predefined hierarchical modulation based training signal comprising predefined UL symbols and LL symbols. In step 610, receiver 30 calculates hierarchical LLRs from the received training signal with respect to the combined signal space 79. In step 615, receiver 30 stores the calculated hierarchical LLRs in LLR LUT 570. Finally, in step 620, receiver 30 switches to a data communications mode and begins to receive data transmitted from transmitter 5 of FIG. 1.

It should be noted that although the above-described embodiment described LL decoder 340 as receiving soft metrics, LL decoder 340 may receive signal points as represented by signal point stream 333 and, as such, further process the received signal point data to derive therefrom LLRs as described above, e.g., LLR decoder 340 includes LLR LUT 570. Conversely, UL demodulator 330 may be modified to include therein LLR LUT 570 for providing the soft metrics to LL decoder 340.

Figure 16:
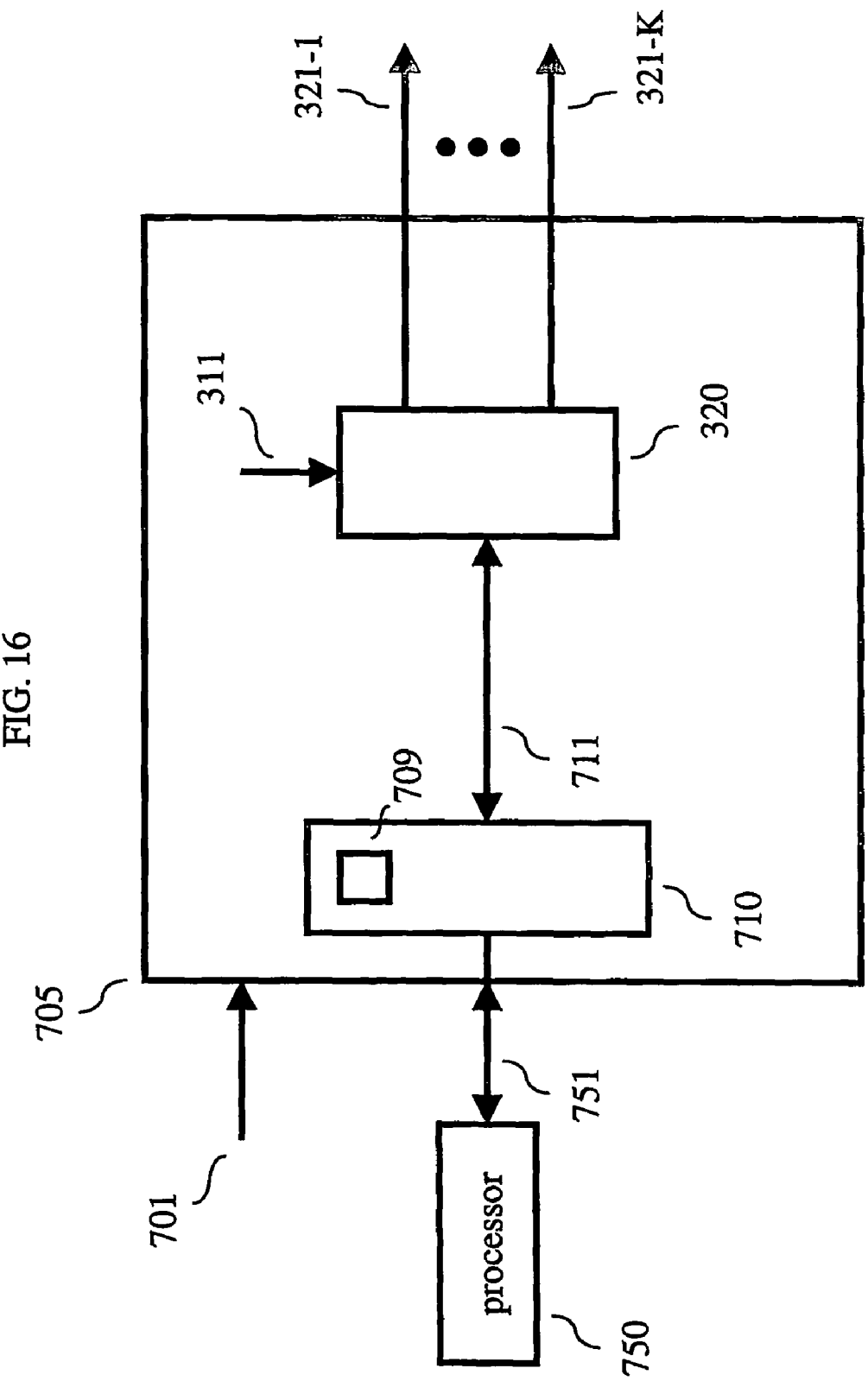
FIG. 16 shows another illustrative embodiment in accordance with the principles of the invention.

Another illustrative embodiment of the inventive concept is shown in FIG. 16. However, only those portions relevant to the inventive concept are shown. For example, analog-digital converters, filters, decoders, etc., are not shown for simplicity. In this illustrative embodiment an integrated circuit (IC) 705 for use in a receiver (not shown) includes simultaneous demodulator/decoder 320 and at least one register 710, which is coupled to bus 751. The latter provides communication to, and from, other components of the receiver as represented by processor 750. Register 710 is representative of one, or more, registers of IC 705, where each register comprises one, or more, bits as represented by bit 709. The registers, or portions thereof, of IC 705 may be read-only, write-only or read/write. In accordance with the principles of the invention, simultaneous demodulator/decoder 320 simultaneously decodes a received hierarchically modulated signal and at least one bit, e.g., bit 709 of register 710, is a programmable bit that can be set by, e.g., processor 750, for controlling this operating mode. In the context of FIG. 16, IC 705 receives an IF signal 701 for processing via an input pin, or lead, of IC 705. A derivative of this signal, 311, is applied to simultaneous demodulator/decoder 320. The latter provides output signals 321-1 through 321-K as described above. Simultaneous demodulator/decoder 320 is coupled to register 710 via internal bus 711, which is representative of other signal paths and/or components of IC 705 for interfacing simultaneous demodulator/decoder 320 to register 710 as known in the art.

In view of the above, it should also be noted that although described in the context of a receiver coupled to a display as represented by TV 35, the inventive concept is not so limited. For example, receiver 30 may be located further upstream in a distribution system, e.g., at a head-end, which then retransmits the content to other nodes and/or receivers of a network. Further, although hierarchical modulation was described in the context of providing communication systems that are backward compatible, this is not a requirement of the inventive concept. It should also be noted that groupings of components for particular elements described and shown herein are merely illustrative. For example, either or both UL decoder 335 and LL decoder 340 may be external to element 320, which then is essentially a demodulator that provides a demodulated signal.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor (DSP) or microprocessor that executes associated software, e.g., corresponding to one or more of the steps shown in FIG. 15. Further, although shown as separate elements, the elements therein may be distributed in different units in -any combination thereof. For example, receiver 30 may be a part of TV 35. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
receiving a hierarchical modulation based signal, the hierarchical modulation based signal comprising at least a first signal layer and a second signal layer; and
simultaneously recovering from the received hierarchical modulation based signal data conveyed in the first signal layer and data conveyed in the second signal layer,
wherein the simultaneously recovering step includes the steps of:
decoding the hierarchical modulation based signal to recover data conveyed in the first signal layer;
generating metrics from the hierarchical modulation based signal as a function of a combined signal space of the hierarchical modulation based signal; and
decoding the hierarchical modulation based signal to recover data conveyed in the second signal layer as a function of the generated metrics.

2. The method of claim 1, wherein the first signal layer is an upper signal layer and the second signal layer is a lower signal layer.

3. The method of claim 1, wherein the metrics are log-likelihood ratios.

4. The method of claim 1, wherein the combined signal space is a combination of a signal space of the first signal layer and a signal space of the second signal layer.

5. The method of claim 1, wherein the generating step includes the step of using the hierarchical modulation based signal as an index into a look-up table of metrics.

6. A receiver comprising:
a demodulator for demodulating a received signal to provide a hierarchical modulation based signal comprising at least two signal layers;
a first decoder operative on the hierarchical modulation based signal for decoding one of the at least two signal layers to provide data therefrom;
a second decoder for providing data from the other of the at least two signal layers, wherein the second decoder operates independently of the first decoder; and
a look-up table for storing therein metrics, wherein the metrics are determined as a function of a combined signal space of the at least two signal layers and wherein the look-up table provides the metrics to the second decoder for use therein for providing the data from the other of the at least two signal layers.

7. The receiver of claim 6, wherein the at least two signal layers include an upper signal layer and a lower signal layer.

8. The receiver of claim 6, wherein the metrics are log-likelihood ratios.

* * * * *